United States Patent
Khopkar et al.

(10) Patent No.: US 8,682,712 B2
(45) Date of Patent: Mar. 25, 2014

(54) MONITORING LANDING PAGE EXPERIMENTS

(75) Inventors: Chirag Khopkar, Seattle, WA (US);
Kenneth Eric Vasilik, Bellevue, WA (US); Zhen Lin, Sammamish, WA (US);
Ariel Bardin, Belmont, CA (US);
Dorothy Ann Nelson, San Jose, CA (US)

(73) Assignee: Google Inc., Mountain View, CA (US)

( * ) Notice: Subject to any disclaimer, the term of this patent is extended or adjusted under 35 U.S.C. 154(b) by 1202 days.

(21) Appl. No.: 11/439,501

(22) Filed: May 22, 2006

(65) Prior Publication Data

US 2007/0271352 A1 Nov. 22, 2007

(51) Int. Cl.
*G06Q 30/00* (2012.01)

(52) U.S. Cl.
USPC .......................................................... 705/14

(58) Field of Classification Search
USPC .......................................................... 705/14
See application file for complete search history.

(56) References Cited

U.S. PATENT DOCUMENTS

| | | |
|---|---|---|
| 5,826,031 A | 10/1998 | Nielsen |
| 5,870,559 A | 2/1999 | Leshem et al. |
| 6,085,229 A | 7/2000 | Newman et al. |
| 6,173,316 B1 | 1/2001 | De Boor et al. |
| 6,405,222 B1 | 6/2002 | Kunzinger et al. |
| 6,405,223 B1 | 6/2002 | Kelley et al. |
| 6,605,120 B1 | 8/2003 | Fields et al. |
| 6,625,803 B1 | 9/2003 | Massena et al. |
| 6,721,922 B1 * | 4/2004 | Walters et al. ........... 716/1 |
| 6,826,594 B1 | 11/2004 | Pettersen |
| 6,920,609 B1 | 7/2005 | Manber et al. |
| 6,934,748 B1 | 8/2005 | Louviere et al. |
| 7,028,001 B1 | 4/2006 | Muthuswamy et al. |
| 7,031,932 B1 | 4/2006 | Lipsky et al. |
| 7,039,599 B2 | 5/2006 | Merriman et al. |
| 7,047,294 B2 | 5/2006 | Johnson et al. |
| 7,047,318 B1 | 5/2006 | Svedloff |
| 7,168,040 B2 | 1/2007 | Yamamoto et al. |
| 7,194,683 B2 | 3/2007 | Hind et al. |
| 7,370,036 B2 | 5/2008 | Vedula |
| 7,523,087 B1 | 4/2009 | Agarwal et al. |
| 7,594,189 B1 | 9/2009 | Walker et al. |
| 7,747,602 B2 | 6/2010 | Sampson |

(Continued)

OTHER PUBLICATIONS

International Search Report and Written Opinion from related International Application No. PCT/US07/69496, mailed Feb. 2, 2009, 10 pages.

(Continued)

*Primary Examiner* — Alvin L Brown
(74) *Attorney, Agent, or Firm* — Fish & Richardson P.C.

(57) ABSTRACT

Methods, systems, and apparatus, including computer program products for monitoring an experiment relating to the conversion rates of landing page variants to test landing page designs. One method includes computing respective conversion rates for each of a plurality of corresponding landing page variants, based on the number of times a conversion page is reached from the corresponding landing page variant, and based on the number of times the corresponding landing page variant is reached from one or more advertisements; and computing a confidence interval for each conversion rate. A user monitoring the experiment can be notified if winning or losing variants emerge. A time to completion of the experiment can be estimated. Presentation to browsing users of winning variants can be favored, and losing variants can be disfavored, during the experiment as they emerge.

26 Claims, 6 Drawing Sheets

(56) References Cited

U.S. PATENT DOCUMENTS

| | | | |
|---|---|---|---|
| 7,895,293 | B1 | 2/2011 | Vasilik |
| 7,895,514 | B1 | 2/2011 | Edmunds et al. |
| 2001/0014895 | A1 | 8/2001 | Sappal |
| 2002/0042738 | A1 | 4/2002 | Srinivasan et al. |
| 2002/0069255 | A1 | 6/2002 | Dinovo |
| 2002/0129064 | A1 | 9/2002 | Guthrie |
| 2002/0143495 | A1* | 10/2002 | Roser .................. 702/179 |
| 2002/0165940 | A1 | 11/2002 | Kameoka et al. |
| 2002/0188508 | A1 | 12/2002 | Lee et al. |
| 2003/0097374 | A1 | 5/2003 | Himeno |
| 2003/0131106 | A1* | 7/2003 | Kasriel ............... 709/225 |
| 2003/0163784 | A1 | 8/2003 | Daniel et al. |
| 2004/0019634 | A1 | 1/2004 | Van Geldern et al. |
| 2004/0107423 | A1 | 6/2004 | Noda |
| 2004/0123247 | A1 | 6/2004 | Wachen et al. |
| 2004/0168122 | A1 | 8/2004 | Kobipalayam Murugaiyan |
| 2005/0021397 | A1* | 1/2005 | Cui et al. ................ 705/14 |
| 2005/0034065 | A1 | 2/2005 | Weight |
| 2005/0071745 | A1 | 3/2005 | Ehrich et al. |
| 2005/0071755 | A1 | 3/2005 | Harrington et al. |
| 2005/0071757 | A1 | 3/2005 | Ehrich et al. |
| 2005/0160002 | A1 | 7/2005 | Roetter et al. |
| 2005/0268229 | A1 | 12/2005 | Wessling et al. |
| 2006/0031417 | A1 | 2/2006 | Narin |
| 2006/0036400 | A1 | 2/2006 | Kasriel et al. |
| 2006/0085731 | A1 | 4/2006 | Cui et al. |
| 2006/0162071 | A1 | 7/2006 | Dixon et al. |
| 2006/0173815 | A1 | 8/2006 | Vedula |
| 2006/0184638 | A1 | 8/2006 | Chua et al. |
| 2006/0218490 | A1 | 9/2006 | Fink |
| 2006/0265400 | A1* | 11/2006 | Fain et al. ................ 707/10 |
| 2006/0271671 | A1 | 11/2006 | Hansen |
| 2006/0288328 | A1 | 12/2006 | Cross, Jr. et al. |
| 2007/0027754 | A1* | 2/2007 | Collins et al. .............. 705/14 |
| 2007/0061700 | A1 | 3/2007 | Kothari et al. |
| 2007/0100956 | A1 | 5/2007 | Kumar |
| 2007/0124192 | A1* | 5/2007 | Moatti .................... 705/10 |
| 2007/0124671 | A1 | 5/2007 | Hackworth et al. |
| 2007/0130510 | A1 | 6/2007 | Dharamshi et al. |
| 2007/0136255 | A1 | 6/2007 | Rizzo et al. |
| 2007/0143672 | A1 | 6/2007 | Lipton et al. |
| 2007/0150353 | A1 | 6/2007 | Krassner et al. |
| 2007/0214237 | A1 | 9/2007 | Stibel et al. |
| 2007/0271352 | A1 | 11/2007 | Khopkar et al. |
| 2007/0271392 | A1 | 11/2007 | Khopkar et al. |
| 2007/0271501 | A1 | 11/2007 | Vasilik |
| 2007/0271511 | A1 | 11/2007 | Khopkar et al. |
| 2007/0276813 | A1 | 11/2007 | Rosen |
| 2007/0299985 | A1 | 12/2007 | Craig et al. |
| 2008/0028334 | A1 | 1/2008 | De Mes |
| 2008/0046415 | A1 | 2/2008 | Henkin et al. |
| 2008/0046507 | A1 | 2/2008 | Westphal |
| 2008/0092060 | A1 | 4/2008 | Berg et al. |
| 2008/0133722 | A1 | 6/2008 | Ramasundaram |
| 2009/0006192 | A1 | 1/2009 | Martinez et al. |
| 2009/0030859 | A1 | 1/2009 | Buchs et al. |
| 2009/0030921 | A1 | 1/2009 | Kadiyska et al. |
| 2009/0113282 | A1 | 4/2009 | Schultz et al. |
| 2009/0150253 | A1 | 6/2009 | Williams et al. |
| 2009/0204579 | A1 | 8/2009 | Govani et al. |
| 2009/0241015 | A1 | 9/2009 | Bender et al. |
| 2009/0300483 | A1 | 12/2009 | Viet |
| 2010/0281389 | A1 | 11/2010 | Hutchinson |
| 2011/0213676 | A1 | 9/2011 | Singh |
| 2012/0150662 | A1 | 6/2012 | Hannon et al. |

OTHER PUBLICATIONS

Brain, Marshall. "How Internet Cookies Work." Apr. 26, 2000. HowStuffWorks.com. Retrieved from the Internet: <http://computer.howstuffworks.com/cookie.htm>.

Kefta—Solutions—Customer Acquisition, "Customer Acquisition—drive more customers with greater efficiency", [online], [retrieved on Jun. 5, 2009]. Retrieved from the Internet: http://web.archive.org/web/20051029081141/www.kefta.com/optimization-solutions/customeracquistion.html.

Kefta's Dynamic Targeting Solution, "It's about creating a meaningful and relevant experience for your visitors", [online], [retrieved on Jun. 5, 2009]. Retrieved from the Internet: htip://web.archive.org/web/20060427125859/www.kefta.com/overview/approach.html.

Kefta—Dynamic Targeting—the next generation of website personalization, "At Kefta, we believe in delivering the *best message at the best time*", [online], [retrieved Jun. 5, 2009]. Retrieved from the Internet: http://web.archive.org/web/20060427132429/www.kefta.com/overview/index.html.

Offermatica: General A/B Test Demo, "What is Offermatica?", [online], [retrieved Jun. 5, 2009]. Retrieved from the Internet: http://web.archive.org/web/20060422201155/www.offermatica.com/demos/ab.html.

Offermatica: Hosted A/B testing, multivariate testing, and landing page optimization tools, "What is Offermatica?", [online], [retrieved Jun. 5, 2009]. Retrieved from the Internet: http://web.arhive.org/web/20060422201114/www.offermatica.com/whatis-1.0.html.

Offermatica: How it Works, [online], [retrieved on Jun. 5, 2009]. Retrieved from the Internet: http://web.archive.org/web/20060428054148/www.offermatica.com/whatis-1.1.1.html.

Optimost: Improve conversion rates on any landing page, splash page, jump page, "Maximize Conversion Rates Increase Your Revenue", [online], [retrieved on Jun. 5, 2009]. Retrieved from the Internet: http://web.archive.org/web/20060425212837/www.optimost.com/.

Touch Clarity—Technology, "Control Groups", [online], [retrieved on Jun. 5, 2009]. Retrieved from the Internet: http://web.archive.org/web/20060503215906/www.touchclarity.com/technology/detail.php?id=78.

Touch Clarity—Technology, "Targeting Engine", [online], [retrieved on Jun. 5, 2009]. Retrieved from the Internet: http://web.archive.org/web/20060503215705/www.touchclarity.com/technology/detail.php?id=76.

Touch Clarity—Technology, "Implementation", [online], [retrieved on Jun. 5, 2009]. Retrieved from the Internet: http://web.archive.org/web/20060503215833/www.touchclarity.com/technology/detail.php?id=80.

Touch Clarity—Technolgy, "Vistor Profiling", [online], [retrieved on Jun. 5, 2009]. Retrieved from the Internet: http://web.archive.org/web/20060503215758/www.touchclarity.com/technology/detail.php?id=77.

"ProHTML ticker, Dynamic Drive," Archived Jan. 1, 2005, [online]; Retrieved from the Internet URL: http://www.dynamicdrive.com/dynamicindex2/prohtmlticker.htm, 2 pages.

Raggett et al., "HTML 4.01 Specification, W3C Recommendation," [online] [retrieved on Dec. 24, 1999]; Retrieved from the Internet URL: http://www.w3.org/TR/1999/REC-htm1401-19991224, 389 pages.

Becamel, Philippe, International Preliminary Report on Patentability in PCT/US2007/069496, mailed Apr. 23, 2009, 8 pages.

DeGroot, "Onmouseover div swap gives flickering effect," webmaster-talk, Jan. 18, 2008, 3 pages.

JavaScript Kit, "Conditional Compilation of Jscript/ JavaScript in IE," 1997-2008, 2 pages.

Vasilik, "Advanced Experiment Techniques", Google Website Optimizer WOAC Summit '08, Nov. 11, 2008, 10 pages.

Freire et al., WebViews: Accessing Personalized Web Content and Services, ACM 2001, pp. 576-586.

Han et al., WebSplitter: A Unified XML Framework for Multi-Device Collaborative Web Browsing, ACM 2000, pp. 221-230.

HTML Tutorial-Attributes, tizag.com, available at http://web.archive.org/web/20081007121302/http://tizag.com/thm1T/htmlattributes.php (archived Dec. 22, 2007).

Writing HTML, 27b. JavaScript-Dynamic Content, Maricopa Center for Learning and Instruction (MCLI), available at http://web.archive.org/web/20081013220058/http://www.mcli.dist.maricopa.edu/tut/tut27b.html (archived Dec. 22, 2007).

Yeeeev, JavaScript—controlling the insertion point for document.write, Stack Overflow, available at http://stackoverflow.com/questions/1536970/javascript-controlling-the-insertion-point-for-document-write (original post Oct. 8, 2009).

(56) References Cited

OTHER PUBLICATIONS

Song et al., Learning Block Importance Models for Web Pages, ACM 2004, pp. 203-211.
Ahuja et al., Perceived Disorientation: An Examination of a New Measure to Access Web Design Effectiveness, Google 2001, pp. 15-29.
Mulvenna et al., Personalization on the Net using Web Mining, ACM 2000, pp. 122-125.
Garofalakis et al., Web Site Optimization Using Page Popularity, IEEE 19994, pp. 22-29.
Jan et al., An Optimization Model for Web Content Adaption, Computer Networks 50 (2006), pp. 953-965.

* cited by examiner

MONITORING LANDING PAGE EXPERIMENTS

BACKGROUND

This disclosure relates to improving the effectiveness of online web advertising.

Advertisers frequently include hyperlinks in their advertisements to pages in their respective web sites. These pages are called "landing pages." A landing page can be designed to request that a browsing user do something, and this request is called the "call to action." If an advertisement is for merchandise, the call to action might request that the browsing user buy the merchandise from an online store. The call to action may not always be successful.

One measure of success for online advertising is "conversion," which is measured by determining whether a browsing user reaches a "conversion page," which can be an ordinary web pages designated by the advertiser for tracking purposes. A conversion page for an online store advertising a hat for sale might be a page for a virtual shopping cart with the hat in the shopping cart. Alternatively, the conversion page can be an order confirmation page that reflects that the hat was actually purchased. If the advertisement had been placed to generate sales leads, the conversion page might be the web page shown after a browsing user submits contact information. If the advertisement had been placed to encourage people to download a movie trailer, the conversion page might be chosen to be the movie trailer download page. Several conversion pages can correspond to a landing page, if the advertiser believes that several possible outcomes correspond to success. A web site for a movie may have several pages providing movie trailers in different resolutions. More generally, several landing pages and conversion pages can correspond to each other.

The advertiser wants browsing users to reach the landing page from the advertisement, then reach the conversion page from the landing page. The percentage of browsing users who, having reached the landing page, then go on to reach the conversion page is called the "conversion rate."

The design of the landing page influences the conversion rate. Low conversion rates can result from poorly designed landing pages and landing pages that do not conform to the subjective expectations of browsing users who selected the corresponding advertisements.

An advertiser can design an experiment to determine empirically which of several landing page designs has the best conversion rate. An advertiser may design two different landing pages, conventionally called landing page A and landing page B. For example, the advertiser may want to compare an original landing page with a landing page with a different headline or a landing page with a different image. The advertiser may then conduct an experiment by running the same advertisement for both landing pages, so that some randomly selected group of visitors who select the advertisement see landing page A and others see landing page B. The advertiser then compares the conversion rates of the two landing pages to determine which is more effective. This technique of comparing whole web pages can be called an A/B comparison, an A/B test, or an A/B experiment. Performing an A/B test can require some statistical expertise on the part of the advertiser.

SUMMARY

This specification describes technologies related to experimentally testing different landing page designs in use.

In general, in one aspect, embodiments of the technologies feature methods, systems, and apparatus, including computer program products. A method in accordance with this aspect includes the actions of receiving user input specifying a landing page, the landing page having one or more sections, each section having a respective original version of content; receiving user input identifying one or more sections of the landing page and for each of the identified sections receiving user input specifying one or more additional versions of content, the original versions and the additional one or more versions together constituting alternative versions for each respective section, and the landing page with the alternative versions for the identified sections together constituting an experiment; determining page fragments operable, when interpreted as part of an instrumented landing page in a client-side browser, to choose one of the alternative versions of each identified section and make each chosen alternative version the content of the corresponding section before the instrumented landing page is displayed by the browser to a browsing user, the chosen alternative versions together defining a combination, and the landing page with the alternative content defined by the combination constituting a variant of the landing page; and instructing a designer to insert the page fragments into the landing page to produce an instrumented landing page. Other embodiments of this aspect feature corresponding systems and computer program products.

These and other embodiments can optionally include one or more of the following features. The designer inserts the page fragments into the landing page. An approving user previews one or more variants of the landing page; and the approving user approves the variants of the landing page. The designer launches the experiment, so that a browsing user who reaches the landing page will be shown any one of a plurality of variants of the landing page. The alternative versions are included within the instrumented landing page. The alternative versions are stored remotely from the instrumented landing page.

In general, in another aspect, embodiments of the technologies feature methods, systems, and apparatus, including computer program products. A method in accordance with this aspect includes the actions of displaying an advertisement on a starting page to a user interacting with a client, the advertisement having a hyperlink to an instrumented landing page; in response to the user selecting the advertisement, downloading the instrumented landing page to the client, the instrumented landing page having one or more sections, each section having a corresponding plurality of alternative versions; choosing in the client a combination of one alternative version for each of the one or more sections; generating in the client a landing page variant of the instrumented landing page, each section of the landing page variant being the corresponding alternative version of the section defined by the combination; notifying a server that the instrumented landing page was reached; notifying the server which combination was chosen; and displaying the landing page variant to the user. Other embodiments of this aspect feature corresponding systems and computer program products.

These and other embodiments can optionally include one or more of the following features. The landing page includes a conversion hyperlink to a conversion page; and after the client displays the landing page variant to the user, in response to the user selecting the conversion hyperlink, the conversion page is downloaded to the client and the server is notified that the conversion page was reached. The alternative versions are included within the instrumented landing page downloaded to the client. The alternative versions are stored remotely from the instrumented landing page. The client implements a client-side scripting language; the instrumented landing page having one or more fragments together including a script written in the client-side scripting language; the client interprets the script to choose the combination; and the client interprets the script to generate the landing page variant by dynamically inserting the chosen alternative versions into the corresponding sections. The client-side scripting language is JavaScript and includes a document.write method; and the script is operable to generate the landing page variant using the JavaScript document.write method before the landing page variant is displayed to the user. The server is notified by encoding the combination into a filename of a small file and requesting the small file from the server.

In general, in another aspect, embodiments of the technologies feature methods, systems, and apparatus, including computer program products. A method in accordance with this aspect includes the actions of computing respective conversion rates for each of a plurality of corresponding landing page variants, based on the number of times a conversion page is reached from the corresponding landing page variant, and based on the number of times the corresponding landing page variant is reached from one or more advertisements; and computing a confidence interval for each conversion rate. A landing page has one or more sections, there being for each of the sections a corresponding plurality of alternative versions. A combination of alternative versions corresponds to each landing page variant, the combination associating one alternative version with each of the sections. Each landing page variant includes the landing page with each of the one or more sections having the version associated with the section by the combination. Other embodiments of this aspect feature corresponding systems and computer program products.

These and other embodiments can optionally include one or more of the following features. The method is performed by software running on one or more servers. The method further includes identifying two landing page variants with the highest conversion rates as winning candidates; determining whether the confidence intervals for the winning candidates are non overlapping; and notifying a monitoring user of the combination of alternative versions with the highest conversion rate if the confidence intervals for the winning candidates are non overlapping. The method further includes determining whether the confidence intervals for the winning candidates are non overlapping and if so automatically ending the experiment. The method further includes identifying as losing candidates any landing page variants having confidence intervals that are non-overlapping from and less than the confidence interval for a baseline landing page variant; and notifying a monitoring user of any losing candidates. The method further includes automatically black-listing any losing candidates so that they are no longer tested. The method further includes identifying one or more landing page variants with the highest conversion rates; identifying one or more landing page variants with the lowest conversion rates; and automatically configuring a landing page server serving the landing page so that the choosing of alternative versions favors the landing page variants with the highest conversion rates and disfavors the landing page variants with the lowest conversion rates. The method further includes estimating a time to completion based on the specified number of alternative versions for each section, an assumed frequency of how often the landing page will be reached, a number of times the landing page has been reached, a baseline percentage of conversions, and an assumed improvement in the percentage of conversions, wherein completion is deemed to have occurred when the confidence intervals for the two landing page vari-
ants with the highest conversion rates become non-overlapping. The method further includes estimating a time to completion based on a projected frequency of how often two landing page variants with the highest conversion rates will be reached, a number of times the two landing page variants have been reached, and the percentage of conversions for both of the two landing page variants, wherein completion is deemed to have occurred when the confidence intervals for the two landing page variants become non-overlapping.

Particular embodiments of the invention can be implemented to realize one or more of the following advantages. Users without statistical expertise can quickly compare a large number of landing page variations, in order to choose a landing page variation with a high conversion rate.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
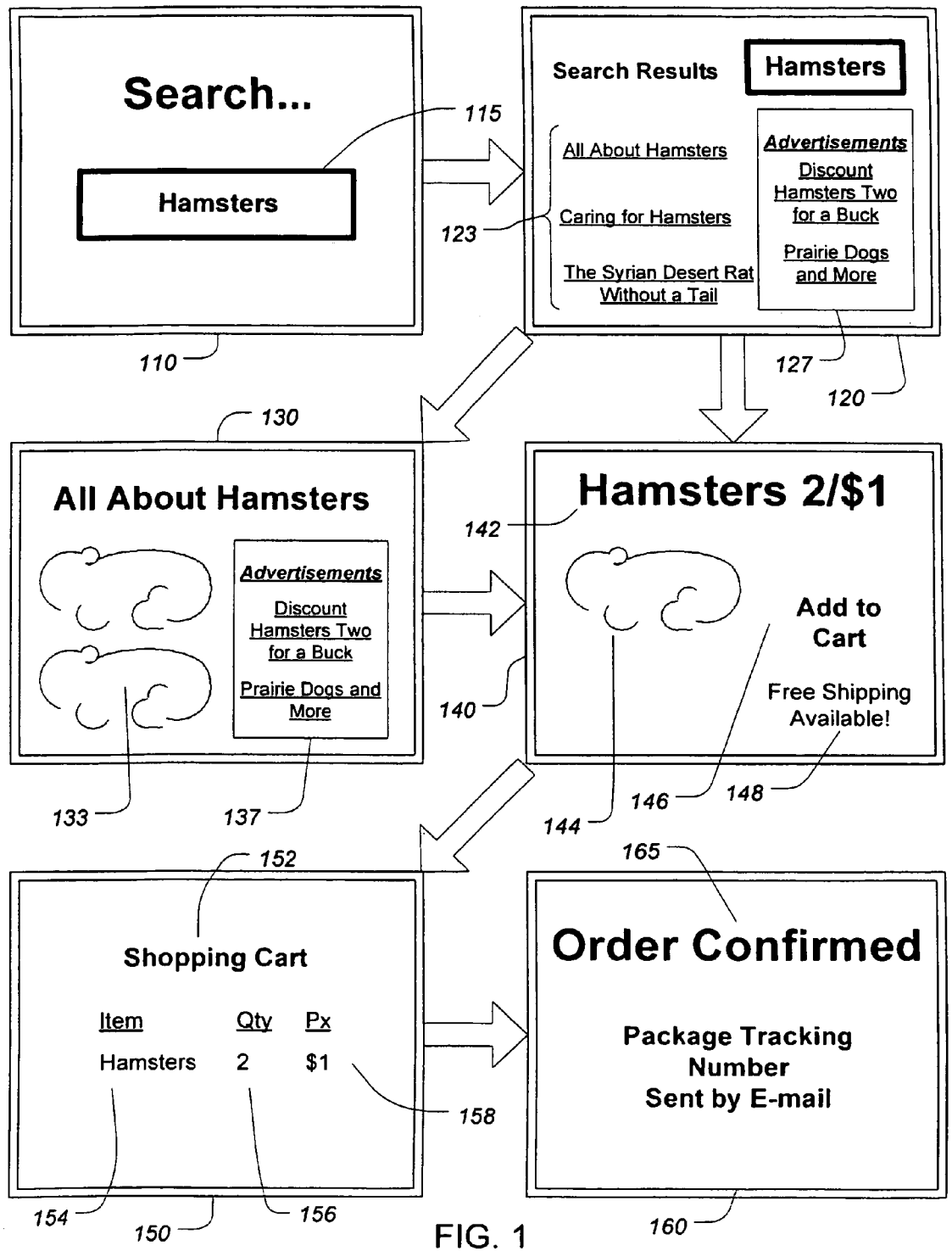
FIG. 1 is an illustration of what a browsing user may see on a client computer when using an online web advertising system.

FIG. 1 is an illustration of what a browsing user may see on a client computer when using a search engine having an online web advertising system. In one implementation, the browsing user uses to a search engine web page 110 which has a text field 115 for entering search terms. In this example the browsing user enters "hamsters" to look for web pages on hamsters.

The search engine subsequently shows the browsing user a search results web page 120 with a listing 123 of web sites, which may be in a ranked order. In this example, because the browsing user searched for "hamsters" the search engine presents the browsing user with search results with hyperlinks 123 to web pages on hamsters. Additionally, the search engine presents the browsing user with advertisements 127 targeted to what the browsing user searched for. In this example, the targeted advertisements are for various online stores selling hamsters. The advertisements 127 each have a hyperlink to a landing page 140, which will generally be on the advertiser's web site.

A browsing user may also see advertisements on a third-party web site 130, i.e., a web site not owned by the provider of the search engine. In this example, the browsing user has come to a web site, which in addition to its regular content 133 has advertisements 137 targeted to the browsing user. Again, the targeted advertisements will have a hyperlink to a landing page 140, which will generally be on the advertiser's web site. In this example, the third-party web site contracted with the search engine to show advertisements. The third-party web site could also contract with another kind of advertising broker or with individual advertisers.

The browsing user sees the landing page 140 on the advertiser's web site after clicking a hyperlink in an advertisement (e.g., one of the advertisements 127, 137). The design of the landing page 140 depends on the purpose of the advertisement. If the purpose was to sell merchandise, the landing page may be designed as a sales pitch. In this example, the advertisement 127 or 137 was intended to sell hamsters, and so the landing page is designed with a suitable heading 142, image 144, text (sometimes called "copy") 148, and call to action 146. The purpose of the advertisement could be almost anything, such as promoting a movie or generating sales leads. The advertiser would design the landing page accordingly.

In one embodiment, the landing page is merely a web page which has been identified as the subject of the experiment, being no different technically than any other kind of web page. The landing page can have content such as headings 142, images 144, hyperlinks, a call to action 146, text 148, or other content including video, audio, Flash movies, or Java applets. The landing page may contain a hyperlink directly to the conversion page 160 to encourage browsing users to reach the conversion page 160. Alternatively, the landing page may have no hyperlink to the conversion page, if the browsing users can reach the conversion page 160 indirectly through one or more other web pages, such as a shopping cart page 150.

Some advertisers may designate a shopping cart page 150 to be the conversion page, although it is not the conversion page in this example. The shopping cart page 150 has an appropriate headline 152. The page indicates that the advertised merchandise 154 has been added to the shopping cart at a quantity 156 and a price 158.

The advertiser chooses as the conversion page a page that indicates to the advertiser that the user was called to action from the landing page in the way that the advertiser intended. In this example, the advertiser designated the order confirmation page 165 to be the conversion page. An user who reaches the order confirmation page 165 purchased merchandise, which is what the advertiser intended. Because the order confirmation page represents earned revenue, designating it to be the conversion page makes it easy for the advertiser to determine the costs and benefits of various advertisements.

Figure 2:
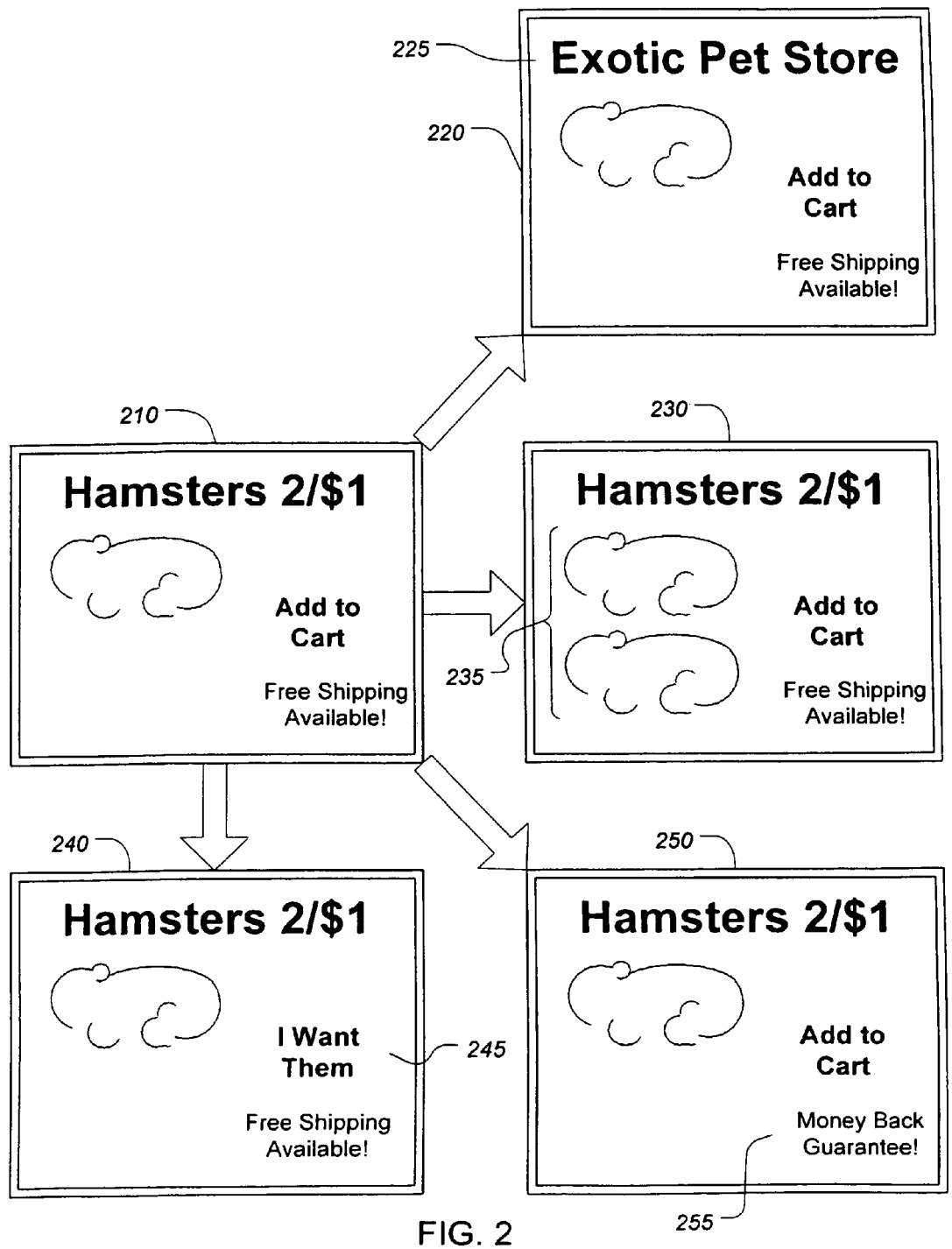
FIG. 2 is an illustration of variations of a landing page that a browsing user may see on a client computer when using an online web advertising system.

FIG. 2 is an illustration of variations of a landing page that a browsing user may see on a client computer when using an online web advertising system.

Advertisers design landing pages expecting to maximize the conversion rate. The original landing page design 210 is the same as the landing page 140 in FIG. 1.

There are several ways to produce variants of landing pages (e.g., landing page variants 220, 230, 240, 250). In one variant 220, an advertiser may change the heading 225. In another variant 230, the advertiser may change the image 235. In another variant 240, the advertiser may change the call to action 245. In another variant 250, the advertiser may change the text 255 or formatting on the landing page. The advertiser can also make multiple changes to the landing page at once, or change any other aspect of the landing page in an attempt to improve the conversion rate.

A computer program will now be described that can be used by an advertiser to manage a landing page experiment to assist in the design of a landing page. In one implementation, the advertiser using a user interface to the program identifies sections in the landing page. The advertiser might designate a headline as one section, and for that reason provide alternative versions of the headline. The advertiser might also designate an image as another section and provide alternative versions of the image. As described below, different combinations of alternative versions are randomly presented to browsing users, and the program gathers data on the conversions for each combination. In one implementation, the computer program does not test all combinations, or does not test all combinations to the end of the experiment. Undesirable combinations can be eliminated during the experiment when early testing shows that they perform poorly. In addition, combinations that were not approved by the advertiser to be part of the test can also be eliminated.

Figure 3:
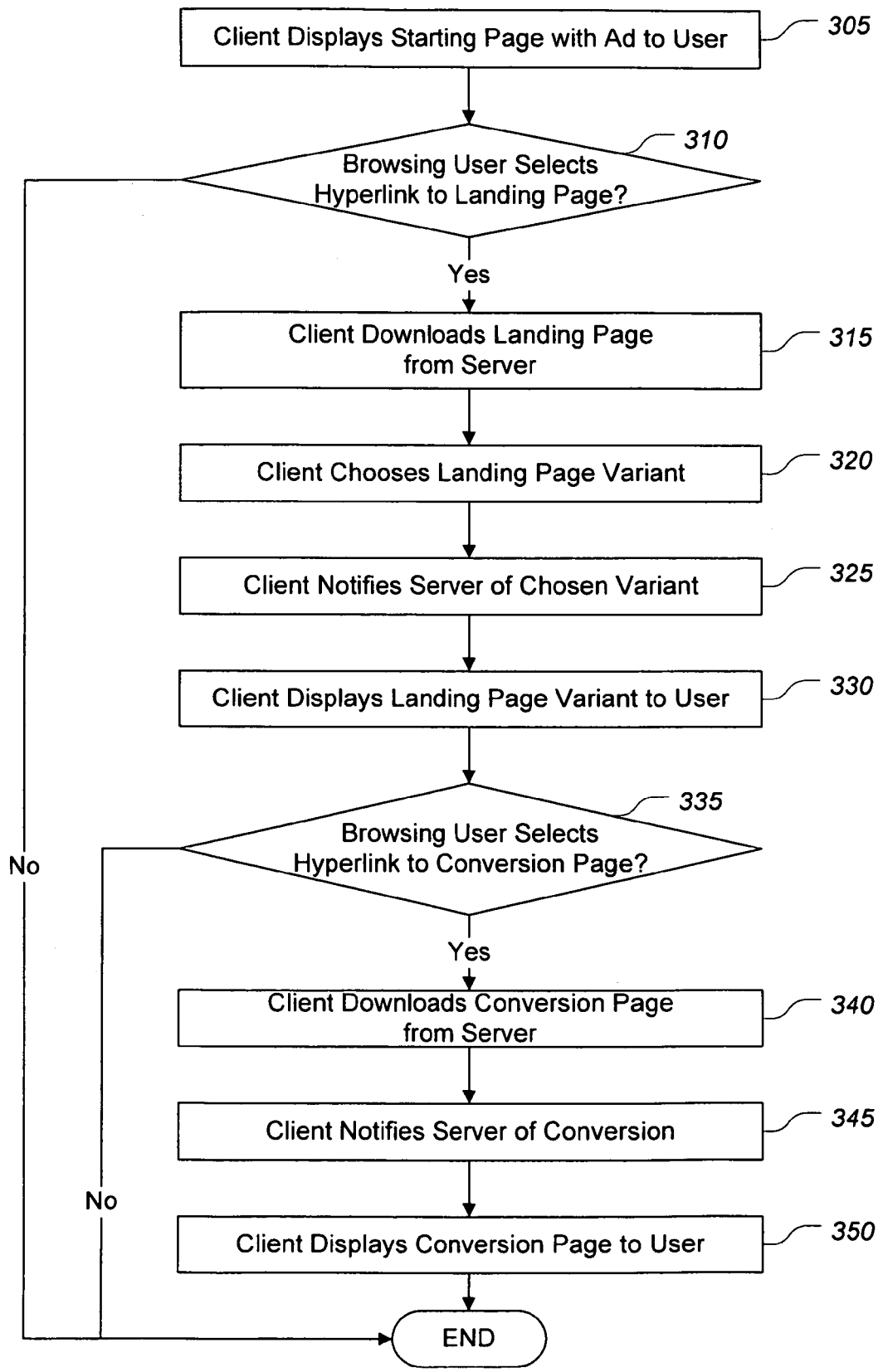
FIG. 3 is a flowchart of how a client computer may display aspects of an online web advertising system when a browsing user uses the system.

FIG. 3 is a flowchart of how a client computer may display aspects of an online web advertising system when a browsing user uses the system.

In one implementation, the client computer begins by displaying a starting page to the browsing user (step 305). The starting page can be any kind of web page, such as a search engine result page 120, a third-party web page 130, or a web-based e-mail page. The starting page has at least one advertisement with a hyperlink to an instrumented landing page. The instrumented landing page is a modified version of the original landing page which has been augmented with page fragments in order to test variations of the original landing page. In another implementation, the starting page with an advertisement is not necessary for the experiment. The landing page can be tested regardless if the user arrives at the landing page through any other means, such as through a search engine or a bookmark.

In one implementation, if the browsing user selects the advertisement (step 310), the client loads the instrumented landing page indicated in the advertisement's hyperlink. In another implementation, the instrumented landing page is substituted for the original landing page. Any of the methods the client would have used to load the original landing page will instead load the instrumented landing page.

The client downloads the instrumented landing page from a server (step 315). The instrumented landing page can be loaded using HTTP (Hypertext Transfer Protocol), WAP (Wireless Application Protocol), or another protocol. The instrumented landing page is a modified version of the original landing page which the experiment was designed to test, augmented with fragments, which may include a content fragment, a combining and previewing fragment, a tracking fragment, and an identification fragment for each section. The fragments can contain markup language tags, e.g., HTML or XML tags. The landing page may have one or more sections, and the sections may each have two or more alternative versions. The instrumented landing page may also include a hyperlink to a conversion page.

The client chooses a landing page variant (step 320). In one implementation, the fragments include a combining and previewing fragment which has a script written in a client-side scripting language the is executed by the client to choose the landing page variant. In one implementation, the client randomly chooses one version for each section from among the alternative versions for the section, using a pseudo-random number generator. The client may also choose alternative versions in a round-robin basis. A white list or black list can be provided in a fragment to limit the experiment to particular combinations, either focusing the experiment on the best candidates or eliminating the worst candidates. In one implementation the choice of a white list or black list is made to minimize the list's size to help the instrumented landing page download faster. The white list and black list can be implemented in terms of ranges or as a list of combinations.

A client-side scripting language can store persistent data, for example in a web browser cookie, identifying which combination was chosen for a particular experiment. In one implementation the script sets the cookie to expire within a reasonably short time, such as in one half hour. As long as the cookie lasts, the combination stored in the cookie is the one that will be displayed to the user. The cookie ensures that the browsing user does not become confused by seeing several different landing page variants for the same URL at about the same time.

The advertiser can store the alternative versions in a content fragment of the instrumented landing page. The content fragment, when present in the instrumented landing page, contains all the alternative versions of the sections for an experiment. Storing the alternative versions in a content fragment of the instrumented landing page can ensure there is no additional latency before the landing page variant is displayed to the browsing user. Additionally, the advertiser need only to be concerned about the security and reliability of the landing page server, and not a second server.

In another implementation, the advertiser can store the alternative versions on a remote server in a single file. Non-technical people can set up the experiment and change it on the fly using a web browser, rather than needing to edit landing page files manually. The remote server can be configured so that non-technical people can modify and run experiments without requiring permission to modify the original landing page files. For example, the remote server can make a copy of the original landing page file and store it on the remote server. This copy can be modified using a web browser interface to indicate sections and provide alternative versions for the sections.

Additionally, the remote server can automatically manage the experiment, for example by black-listing poor-performing combinations, white-listing the combinations with the best conversion rates, and/or starting and stopping the experiment automatically.

The alternative versions for the sections can be stored in obfuscated format, whether they are stored in a content fragment or stored remotely in a single file. Obfuscating the alternative versions can enhance privacy and simplify computer programming. Certain special characters need to be encoded, or "escaped," when text is inserted into an HTML file, to preserve the HTML structure. It can be easier to simply encode all of the characters, as obfuscation does.

There are several ways a client can substitute alternative versions to generate a landing page variant that is displayed to a browsing user. In one implementation, the fragments include a combining and previewing fragment which has a script written in a client-side scripting language, and an identification fragment in each section with a function call in the same scripting language. The client interprets the script before the landing page is displayed to the browsing user. The function call in each section calls the script in the combining and previewing fragment to substitute an alternative version into its section. The script uses the JavaScript document.write method to insert raw text into an in-memory version of an HTML file. The document.write method is fast, and because it is run before the landing page is displayed, the browsing user does not see "flicker," as would be the case if the page were updated after being displayed.

In another implementation, a script in the combining and previewing fragment uses a Document Object Model API (application programming interface) to modify a hierarchical in-memory representation of the HTML file, inserting, modifying, or deleting elements. Where the landing page is written in XML and not HTML, the document.write method may be unavailable and so the Document Object Model API may be used instead of document.write. In another implementation, rather than writing the alternative versions to each section, the alternative versions are all present in their respective section, and CSS (Cascading Style Sheets) attributes are used to show the chosen alternative version in each section and hide the others. In another implementation, the landing page is written in Macromedia Flash, the script in the combining and previewing fragment is written in ActionScript, and the ActionScript DOM API is used to modify the in-memory representation of the Flash landing page.

The NOSCRIPT tag can be used to encapsulate default alternative versions for each section. Clients with client-side scripting languages ignore the content delimited by this tag, but clients without such scripting languages display the content. Because an instrumented landing page relies on a client-side script, encapsulating a default alternative version inside the NOSCRIPT tag ensures that browsing users using browsers without client-side scripting language support will see an operational landing page. These browsing users do not participate in the experiment, so data need not be kept on their conversion rate.

The experiment can be configured to test landing page variants on fewer than all browsing users. For example, an advertiser may want to run the experiment a long time to test landing page variants on a representative sample of browsing users, but testing all browsing users in that time may result in a needlessly large sample size. Testing landing page variants that have a lower conversion rate than the original landing page has a real cost in terms of lost conversions. The advertiser therefore can choose to test only a fourth, a tenth, or some other fraction of web page visitors. In one implementation, a script in the instrumented landing page chooses a pseudorandom number using the JavaScript math.random method and tests the number against a predetermined threshold, which is selected to achieve a desired fraction of users participating in the experiment. The browsing user instead, sees a default landing page constructed by choosing a default combination of alternative versions.

One implementation provides a preview function in the combining and previewing fragment. A special parameter may allow a specified combination of alternative versions, so that various landing page variants can be previewed one-by-one to allow the advertiser to manually black-list clearly undesirable combinations. Appending "?preview=2-2-2" to the URL of the landing page in this implementation shows the second alternative version for each section of the landing page. Although the parameter resembles a server-side CGI parameter, it is not necessary to use CGI to preview the landing page. Scripts running in the client can use the JavaScript document.URL method to determine the combination requested by the browsing user and substitute the corresponding alternative versions into the document sections. One implementation does not collect data on conversions during preview mode, and turns off data collection by deleting the combination cookie, if such a cookie exists.

The advertiser can manually turn the experiment on and off in one implementation by setting an appropriate variable in one of the landing page fragments. If the experiment is turned off, all browsing users see the default combination and no data is collected on conversions.

The client can notify the server that the chosen landing page variant has been reached (step 325). For example, the client can request a file, e.g., a one-pixel GIF graphic bitmap file, the request encoding the combination and the fact that the landing page has been reached in the filename. A filename containing "2-2-2" can signify that of three sections in a landing page experiment, the second alternative was chosen for each one. The filename can identify a profile, which corresponds to a set of pages to track. The filename can also identify the experiment, allowing the same server to track many experiments for many advertisers, each advertiser potentially having many profiles. The client can also notify the server by setting cookies and then sending the cookies to the server. Another way of notifying the server is to use a separate notification for reaching the landing page and for choosing the combination. An implementation can use the HTTP GET, POST, or PUT methods for notifying the server, and can use the HTTP method synchronously or asynchronously.

The client then displays the landing page to the browsing user (step 330). The landing page can have a hyperlink to the conversion page.

The browsing user can select the hyperlink to the conversion page (step 335), if the landing page has such a hyperlink. Otherwise the browsing user can reach the conversion page through other web pages, through a bookmark, or through typing in the address of the conversion page manually. In one implementation, if the browsing user declines to select the hyperlink or otherwise reach the conversion page within a certain time period, such as half an hour, a cookie in the client web browser expires and the visit to the landing page is treated as a non-conversion.

The client downloads the conversion page from the server (step 340). The same protocol used to download the landing page can be used for this as well.

The client notifies the server that conversion has occurred (step 345). In one implementation, the conversion page contains a tracking fragment with a script written in JavaScript that requests a file, e.g., one-pixel GIF graphic file, in the same way that the script in the landing page does. That is, the script encodes the chosen combination in the name of the file. The client can notify the server of the conversion page which was reached, if several conversion pages correspond to a single landing page.

The tracking fragment can be included in other files on the web site, as well. If the client reaches these other web pages after the landing page, whether before or after the conversion page, the tracking fragment can notify the server of a session identifier so that the browsing user can be tracked through the web site. The server can analyze how individual browsing users reach different parts of the web site to help the advertiser determine how the website should be redesigned.

The client displays the conversion page to the browsing user (step 350).

Figure 4:
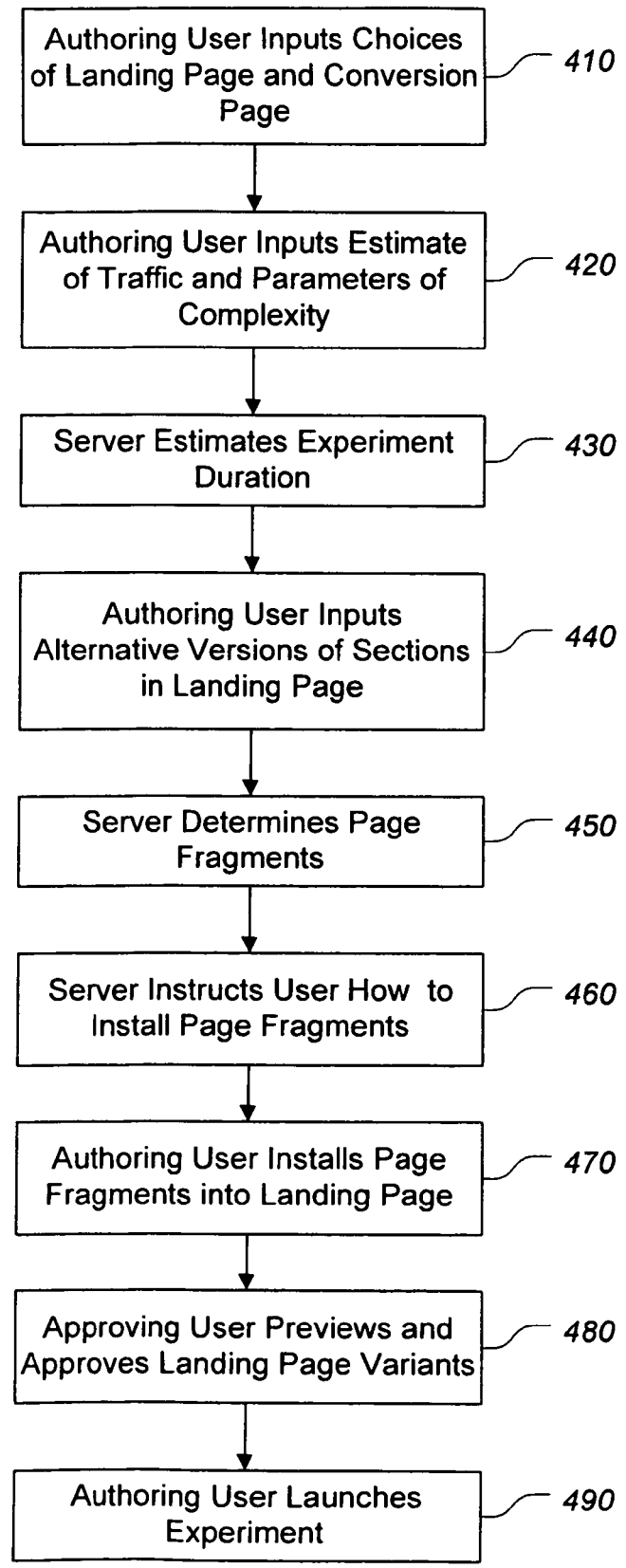
FIG. 4 is a flowchart of how a designer may use an online web advertising system.

FIG. 4 is a flowchart of how a designer may use an online web advertising system that includes a landing page optimizer. The designer uses the landing page optimizer on behalf of an advertiser, and can be for example an employee or a consultant of the advertiser or the advertiser himself or herself.

In one implementation, the landing page optimizer operates as an online service that can be used through a web browser in a client computer. The designer can download a landing page optimizer web page into his web browser and select multivariate testing. The landing page optimizer can additionally support other modes of testing, such as A/B testing, for advertisers whose traffic is fairly low, such as fewer than 10,000 page views a day, and for advertisers who wish to test moving sections around or test changing the overall look of the page.

The designer begins to set up an experiment by inputting addresses for an original landing page and a conversion page (step 410). The designer can also input a name for the experiment for his or her convenience, if the designer intends to conduct multiple experiments simultaneously.

The designer inputs an estimate of current traffic for the landing page and the complexity of the desired experiment in terms of the number of sections and the number of alternative versions for each section (step 420). In one implementation, the maximum number of sections is eight and the maximum number of alternative versions for each section is 127. The designer also inputs an estimate of the current conversion rate.

From these numbers, the landing page optimizer can estimate the duration of the experiment (step 430). In one implementation the estimate is based on an assumption that one of the variations will achieve a 10% improvement in conversion rate (e.g., from 5.0% to 5.5%). The designer can specify that only a fraction of browsing users will participate in the experiment. Specifying such a fraction prolongs the duration of the experiment by a factor of the inverse of the fraction.

The designer also inputs the page sections and alternative versions for the experiment (step 440). In one implementation, the designer specifies original versions of all the sections, such as by pasting in sections of an HTML file, and then subsequently modifies the original versions to produce alternative versions for each section. In another implementation, the server retrieves a copy of the original landing page document using the address previous supplied by the designer, and displays the copy's HTML to the designer. The designer indicates what parts of the HTML should be designated as the original versions of sections, and then as before modifies those original versions to produce alternative versions for each section.

In one implementation, the server then generates page fragments based on the alternative versions for each section, and provides them to the designer (step 450). The page fragments can include a content fragment, a combining and previewing fragment, a tracking fragment, and an identification fragment for each section. The page fragments can include one or more scripts written in a client-side scripting language, e.g., JavaScript, VBScript or ECMAScript, and can include HTML or XML tags and content. In another implementation, the designer's client computer can download a script written in a client-side scripting language, and that script can generate the page fragments. In another implementation, all of the page fragments are provided to the designer, except for one page fragment, the content fragment. Rather than providing a content fragment, the server prepares a content file to be stored remotely from the landing page.

In one implementation, the server instructs the designer through the designer's client computer on how to install the page fragments into the landing page (step 460). The designer then installs the page fragments into the landing page according to instructions provided by the server or client-side script, producing an instrumented landing page (step 470). In another implementation, the server prompts the designer to ask a person of technical skill to install the page fragments for the designer, for example, the prompt can include an e-mail message to send to such a person. In another implementation, the page fragments can be installed into the landing page automatically by the server.

In one implementation, the landing page variants are available for preview. An approving user, who may be the designer, the advertiser, or an employee or consultant of the advertiser, previews and approves the landing page variants 480. It is not necessary to preview all or even any of the variations before approving them.

The designer then launches the experiment (step 490). The approving user can also launch the experiment.

Figure 5:
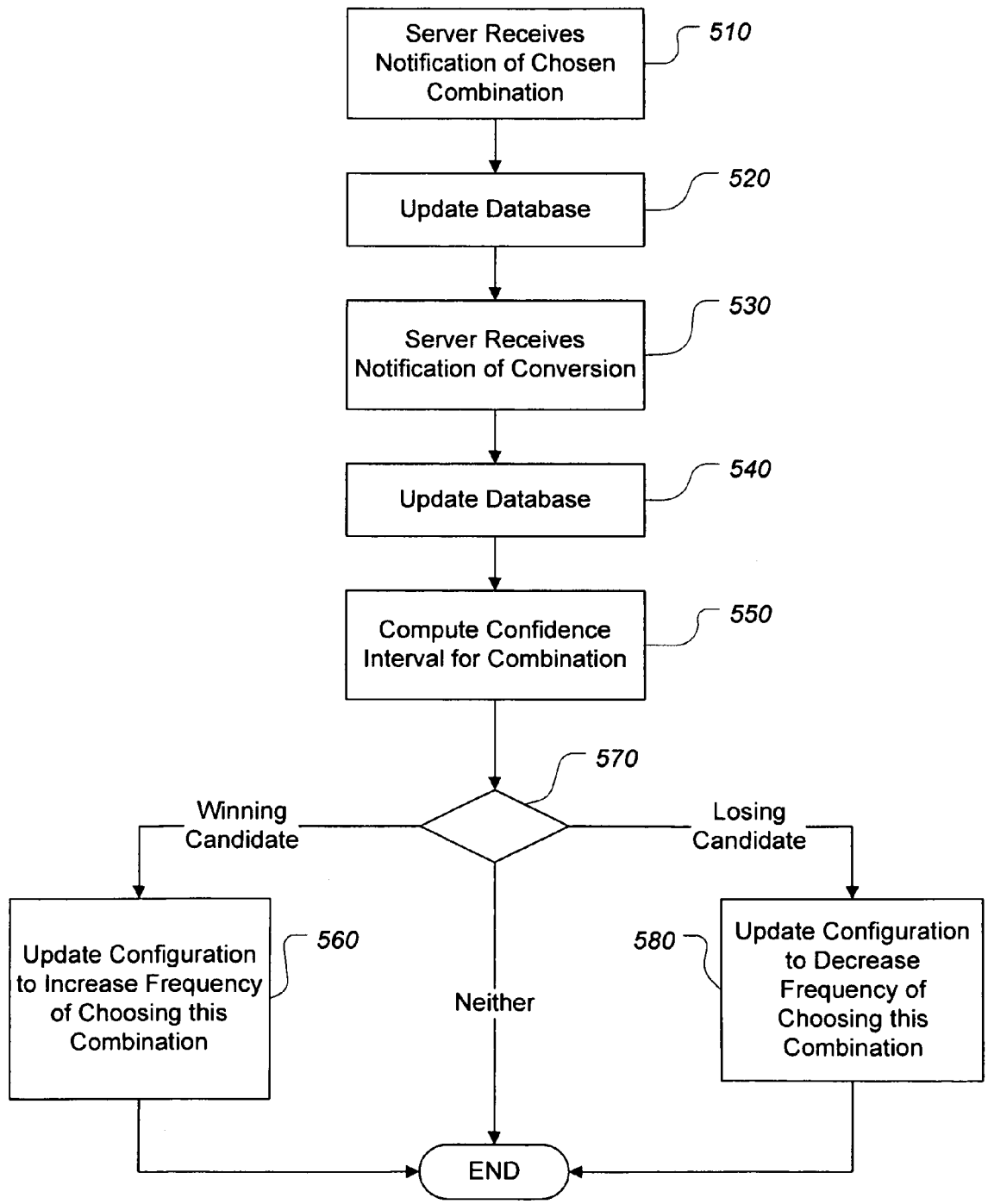
FIG. 5 is a flowchart of how a server computer may operate as a browsing user uses an online web advertising system.

FIG. 5 is a flowchart of how a server may operate as a browsing user uses an online web advertising system. In one implementation, this server is the same as the web server providing the landing page and conversion page. In another implementation, the servers are distinct.

The server receives notification that the landing page has been reached, including the chosen combination and the experiment number, from the client (step 510). The notification can be received through any HTTP method, including the client requesting a specially-named file, where the name provides the information to the server.

The server updates a database with the combination chosen and the experiment number (step 520). The server can optionally keep ancillary information such as the date and time and the browsing user's geographic location, which can be known with reasonable accuracy by looking up the browsing user's IP address. The can is kept in one or more other servers distinct from the server receiving the notification or on on the same server.

The server receives notification of the conversion (step 530). The notification can be sent and received in the same way the landing page notification is sent and received. The server updates a database with notification information (step 540).

In one implementation, the server computes a confidence interval for the conversion (step 550). The confidence interval can be computed by treating the various combinations as statistical samples of Bernoulli variables from unrelated populations, making each combination have a binomial distribution. The confidence interval can be computed by finding the standard error, and then multiplying the standard error by a constant to give the desired confidence level. In one implementation, the confidence level is 80%.

The server evaluates the confidence interval of the combination against a baseline confidence interval (step 570). In one implementation, if the lower end of the confidence interval is greater than the upper end of the baseline confidence interval, the combination is treated as a "winning candidate." If the confidence interval is less than the baseline, with no overlap, the combination is treated as a "losing candidate." Otherwise no label is attached.

Optionally, the configuration of the experiment can be automatically adjusted so that a "winning candidate" is tested more frequently (step 560). Optionally, the configuration of the experiment can be automatically adjusted so that a "losing candidate" is tested less frequently (step 580). Adjusting the configuration of the experiment is facilitated if the instrumented landing page retrieves the content in a single file from a remote server, because the content file can be modified, such as with a white list or a black list, to adjust the testing frequencies of the various combinations. Alternatively, if the content is stored not in a single remote file but in a content fragment of the instrumented landing page, the configuration of the experiment can be adjusted in one of several ways. The remote server can alert the advertiser by e-mail or SMS to manually adjust the configuration. The advertiser's web server can also poll the remote server regularly to download adjustments to the configuration.

Figure 6:
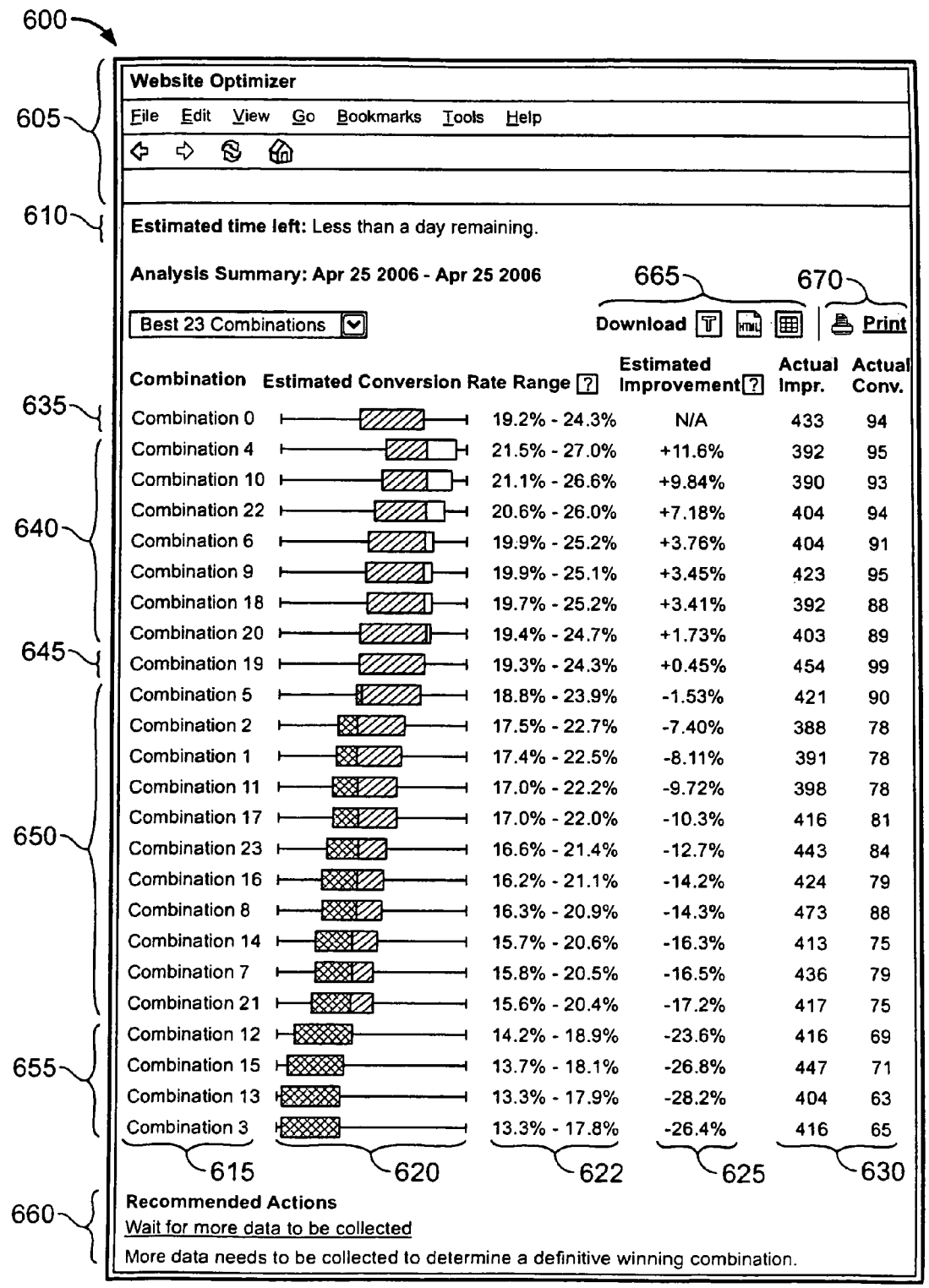
FIG. 6 is an illustration of what a monitoring user may see on a client computer when using an online web advertising system.

FIG. 6 is an illustration 600 of what a monitoring user may see on a client computer when using an online web advertising system that includes a landing page optimizer. The monitoring user can watch the progress of an experiment which has been launched. Much of what is described as being computed by the server could also be computer by the client, through an appropriate script in a client-side scripting language.

In one implementation, a client computer uses a web browser 605 to display a user interface to a monitoring user. The client computer receives notifications from a server computer to display to the monitoring user.

The user interface can display an estimated duration 610 until the experiment is finished. In one implementation, the duration is calculated by the server computer and sent to the client computer to be displayed to the monitoring user. The server can calculate the duration based on preliminary data of how many times the landing page variants have been displayed to browsing users and how many times of those have resulted in conversions.

The user interface can display a list of combinations 615, and for each combination display a confidence interval for the conversion rate. The confidence interval can be displayed graphically and numerically. In one implementation, the graphical confidence intervals 620 are unlabeled horizontal line segments. Each horizontal segment has an interval indicated, corresponding to each combination's confidence interval. The left-hand endpoint represents a conversion rate slightly less than the lowest estimated conversion rate range for all of the combinations. The right-hand endpoint represents a conversion rate slightly more than the highest estimated conversion rate range. Thus, all of the graphical confidence intervals 620 have the same scale and can therefore be compared visually. The intervals can be tri-colored, where one color represents the baseline confidence interval (hatched in FIG. 6), one color represents the part of any confidence interval less than the baseline (black in FIG. 6), and one color represents the part of any confidence interval greater than the baseline (clear in FIG. 6).

The user interface can display the conversion rate confidence interval numerically 622. In one implementation, the confidence intervals are displayed to three digits of precision.

The user interface can display the estimated improvements 625 numerically. For example, if the baseline conversion rate was 5.0%, and a combination was estimated to have a conversion rate of 5.5%, the estimated improvement could be displayed as 10.0% for that combination.

The user interface can display the actual data 630 for the combinations, showing the number of times each combination's landing page variant was displayed to browsing users, and how many of those resulted in conversions.

The user interface can display conversion rate statistics 635 for a baseline combination. The baseline combination can be original versions of content for the respective sections. The user interface can display the graphical confidence interval 620, the numerical confidence interval 622, the estimated improvement 625, and the raw data for the baseline 630. In one implementation, the graphical confidence interval for the baseline combination has a uniformly colored interval (hatched in 620), representing that this interval is the confidence interval for the baseline combination.

The client computer can display similar statistics for combinations 640, 645 which appear to have better conversion rates than the baseline. Combinations 640 have confidence intervals which overlap partially with the baseline confidence interval. Another combination 645 may a confidence interval which overlaps entirely with the baseline confidence interval. All of these have a positive estimated improvement 625 in the conversion rate. Other combinations may have confidence intervals which are greater than and non-overlapping with the baseline confidence interval, but none are shown in FIG. 6.

For the combinations 640 with confidence intervals that partially overlap the baseline confidence interval 635, the partial overlap can be depicted graphically. In one implementation, the part of the confidence intervals which is greater than the confidence interval for the baseline is given one color, indicated in FIG. 6 by clear color, and the remaining part is colored in another color, indicated in FIG. 6 by hatching.

In one implementation, the server calculates the confidence intervals with 80% confidence level. When two confidence intervals (with an 80% confidence level) do not overlap, there is at least a 95% probability that the conversion rates represented by the confidence intervals are corrected ordered. Therefore, for any one of the combinations which partially overlap the baseline confidence interval, there is at least a 5% chance that the baseline combination would actually be shown to have a higher conversion rate if enough data were gathered. Many other choices of confidence level are viable. Choosing a higher confidence level would result in a greater probability that the conversion rates are correctly ordered, at the cost of requiring the experiment to run longer to gather more data. The opposite would be true for choosing a lower confidence level.

The client computer can display conversion rate statistics for combinations 650 which are estimated to be worse than the baseline, but which have confidence intervals partially overlapping the baseline confidence interval. In one implementation, the server colors the graphical confidence intervals 620 partly in one color, indicated in FIG. 6 by black, to show the part of the confidence interval less than the baseline, and colors the other with another color, indicated in FIG. 6 by hatching. In one implementation, the server computes the confidence intervals so that this partial overlap means that for any one combination, there is a greater than 5% chance that with a very large sample, it would be revealed that the combination actually has a better conversion rate than the baseline.

The client computer can display conversion rate statistics for combinations 655 which are estimated to be worse than the baseline, and which have confidence intervals not overlapping the baseline confidence interval. In one implementation the graphical confidence intervals are colored in a single color, indicated in FIG. 6 by black, to show that the confidence intervals are less than and do not overlap the baseline confidence interval. In one implementation, for any one of these combinations, there is a less than 5% chance that the combination actually has a higher conversion rate than the baseline. Therefore, these combinations may be deemed to be "losing candidates" with relative certainty.

In one implementation, the client can display a recommendation 660 from the server. It may be that the two combinations with the highest estimated conversion rates, or the "best candidates," have confidence intervals which do not overlap. In this situation server can recommend the best candidate with the higher conversion rate. Otherwise, the server can recommend waiting for a more definitive conclusion on which combination has the highest conversion rate.

In one implementation the statistics and data on the conversions may be downloaded 665 in tabular format. The server may also offer a more convenient format of the web page for printing 670.

The various aspects of the subject matter described in this specification and all of the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Various aspects of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject matter of this specification has been described in terms of particular embodiments, but other embodiments can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims. The same experimental techniques work for any web page, not merely advertising landing pages. Any web site owner can experimentally determine how good his or her web site design is and which web pages should be targeted for improvement. The web site owner merely needs to designate a test page and a goal page. A goal rate can be calculated as the percentage of browsing users who, having reached the test page, go on to reach the goal page. The goal rate can be interpreted as a measure of success. In this specification, in order to adopt the commonly used terminology, "landing page" is used to include all test pages whether or not arrived at through an advertisement, and "conversion page" is used to include all goal pages.

What is claimed is:

1. A computer-implemented method comprising: for each of a plurality of client devices:
providing an instrumented landing page to a client device in response to a selection of an advertisement, the instrumented landing pare comprising one or more sections, each section having a corresponding plurality of alternative versions, and wherein each particular combination of the one or more sections having a respective alternative version forms a landing page variant, and
receiving a notification of a particular landing pare variant of a plurality of landing page variants chosen by the client device; and
computing, by one or more processors, respective conversion rates for each of the plurality of corresponding landing page variants selected by the respective plurality of client devices, the computing based on the number of times a conversion page is reached from the corresponding landing page variant, and based on the number of times the corresponding landing page variant is reached in response to selections of one or more displayed advertisements, wherein:
a combination of alternative versions corresponds to each landing page variant, the combination associating one alternative version with each of the sections; and
each landing page variant comprises the landing page with each of the one or more sections having the version associated with the section by the combination; and
computing a confidence interval for each conversion rate.

2. The method of claim 1, wherein: the method is performed by software running on one or more servers.

3. The method of claim 1, further comprising: identifying two landing page variants with the highest conversion rates as winning candidates; determining whether the confidence intervals for the winning candidates are non-overlapping; and notifying a monitoring user of the combination of alternative versions with the highest conversion rate if the confidence intervals for the winning candidates are non-overlapping.

4. The method of claim 3, further comprising: determining whether the confidence intervals for the winning candidates are non-overlapping and if so automatically ending the experiment.

5. The method of claim 1, further comprising: identifying as losing candidates any landing page variants having confidence intervals that are non-overlapping from and less than the confidence interval for a baseline landing page variant; and notifying a monitoring user of any losing candidates.

6. The method of claim 5, further comprising: automatically black-listing any losing candidates so that they are no longer tested.

7. The method of claim 1, further comprising: identifying one or more landing page variants with the highest conversion rates; identifying one or more landing page variants with the lowest conversion rates; and automatically configuring a landing page server serving the landing page so that the choosing of alternative versions favors the landing page variants with the highest conversion rates and disfavors the landing page variants with the lowest conversion rates.

8. The method of claim 1, further comprising: estimating a time to completion based on the specified number of alternative versions for each section, an assumed frequency of how often the landing page will be reached, a number of times the landing page has been reached, a baseline percentage of conversions, and an assumed improvement in the percentage of conversions, wherein completion is deemed to have occurred when the confidence intervals for the two landing page variants with the highest conversion rates become non-overlapping.

9. The method of claim 1, further comprising: estimating a time to completion based on a projected frequency of how often two landing page variants with the highest conversion rates will be reached, a number of times the two landing page variants have been reached, and the percentage of conversions for both of the two landing page variants, wherein completion is deemed to have occurred when the confidence intervals for the two landing page variants become non-overlapping.

10. A system comprising: one or more computing devices configured to perform operations including: for each of a plurality of client devices:
  providing an instrumented landing page to a client device in response to a selection of an advertisement, the instrumented landing page comprising one or more sections, each section having a corresponding plurality of alternative versions, and wherein each particular combination of the one or more sections having a respective alternative version forms a landing page variant, and
  receiving a notification of a particular landing page variant of a plurality of landing page variants chosen by the client device; and
  computing respective conversion rates for each of the plurality of corresponding landing page variants selected by the respective plurality of client devices, the computing based on the number of times a conversion page is reached from the corresponding landing page variant, and based on the number of times the corresponding landing page variant is reached in response to selections of one or more displayed advertisements, wherein:
  a combination of alternative versions corresponds to each landing page variant, the combination associating one alternative version with each of the sections; and
  each landing page variant comprises the landing page with each of the one or more sections having the version associated with the section by the combination; and
  computing a confidence interval for each conversion rate.

11. The system of claim 10, wherein: computing respective conversion rates is computed using software running on one or more servers; and computing a confidence interval for each conversion rate is computed using software running on one or more servers.

12. The system of claim 10, further configured to perform operations comprising: identifying two landing page variants with the highest conversion rates as winning candidates; determining whether the confidence intervals for the winning candidates are non-overlapping; and notifying a monitoring user of the combination of alternative versions with the highest conversion rate if the confidence intervals for the winning candidates are non-overlapping.

13. The method of claim 12, further configured to perform operations comprising: determining whether the confidence intervals for the winning candidates are non-overlapping and if so automatically ending the experiment.

14. The system of claim 10, further configured to perform operations comprising: identifying as losing candidates any landing page variants having confidence intervals that are non-overlapping from and less than the confidence interval for a baseline landing page variant; and notifying a monitoring user of any losing candidates.

15. The method of claim 14, further configured to perform operations comprising: automatically black-listing any losing candidates so that they are no longer tested.

16. The system of claim 10, further configured to perform operations comprising: identifying one or more landing page variants with the highest conversion rates; identifying one or more landing page variants with the lowest conversion rates; and automatically configuring a landing page server serving the landing page so that the choosing of alternative versions favors the landing page variants with the highest conversion rates and disfavors the landing page variants with the lowest conversion rates.

17. The system of claim 10, further configured to perform operations comprising: estimating a time to completion based on the specified number of alternative versions for each section, an assumed frequency of how often the landing page will be reached, a number of times the landing page has been reached, a baseline percentage of conversions, and an assumed improvement in the percentage of conversions, wherein completion is deemed to have occurred when the confidence intervals for the two landing page variants with the highest conversion rates become non-overlapping.

18. The system of claim 10, further configured to perform operations comprising: estimating a time to completion based on a projected frequency of how often two landing page variants with the highest conversion rates will be reached, a number of times the two landing page variants have been reached, and the percentage of conversions for both of the two landing page variants, wherein completion is deemed to have occurred when the confidence intervals for the two landing page variants become non-overlapping.

19. A computer program product, encoded on a non-transitory computer-readable medium, operable to cause data processing apparatus to perform operations comprising: for each of a plurality of client devices:
  providing an instrumented landing pare to a client device in response to a selection of an advertisement, the instrumented landing page comprising one or more sections, each section having a corresponding plurality of alternative versions, and
  wherein each particular combination of the one or more sections having a respective alternative version forms a landing pare variant, and receiving a notification of a particular landing page variant of a plurality of landing page variants chosen by the client device; and
  computing respective conversion rates for each of the plurality of corresponding landing page variants selected by the respective plurality of client devices, the computing based on the number of times a conversion page is reached from the corresponding landing page variant, and based on the number of times the corresponding landing page variant is reached in response to selections of one or more displayed advertisements, wherein:

a landing page comprises one or more sections, there being for each of the sections a corresponding plurality of alternative versions;

a combination of alternative versions corresponds to each landing page variant, the combination associating one alternative version with each of the sections; and each landing page variant comprises the landing page with each of the one or more sections having the version associated with the section by the combination; and computing a confidence interval for each conversion rate.

20. The product of claim 19, further operable to cause data processing apparatus to perform operations comprising: identifying two landing page variants with the highest conversion rates as winning candidates; determining whether the confidence intervals for the winning candidates are non-overlapping; and notifying a monitoring user of the combination of alternative versions with the highest conversion rate if the confidence intervals for the winning candidates are non-overlapping.

21. The product of claim 20, further operable to cause data processing apparatus to perform operations comprising: determining whether the confidence intervals for the winning candidates are non-overlapping and if so automatically ending the experiment.

22. The product of claim 19, further operable to cause data processing apparatus to perform operations comprising: identifying as losing candidates any landing page variants having confidence intervals that are non-overlapping from and less than the confidence interval for a baseline landing page variant; and notifying a monitoring user of any losing candidates.

23. The product of claim 22, further operable to cause data processing apparatus to perform operations comprising: automatically black-listing any losing candidates so that they are no longer tested.

24. The product of claim 19, further operable to cause data processing apparatus to perform operations comprising: identifying one or more landing page variants with the highest conversion rates; identifying one or more landing page variants with the lowest conversion rates; and automatically configuring a landing page server serving the landing page so that the choosing of alternative versions favors the landing page variants with the highest conversion rates and disfavors the landing page variants with the lowest conversion rates.

25. The product of claim 19, further operable to cause data processing apparatus to perform operations comprising: estimating a time to completion based on the specified number of alternative versions for each section, an assumed frequency of how often the landing page will be reached, a number of times the landing page has been reached, a baseline percentage of conversions, and an assumed improvement in the percentage of conversions, wherein completion is deemed to have occurred when the confidence intervals for the two landing page variants with the highest conversion rates become non-overlapping.

26. The product of claim 19, further operable to cause data processing apparatus to perform operations comprising: estimating a time to completion based on a projected frequency of how often two landing page variants with the highest conversion rates will be reached, a number of times the two landing page variants have been reached, and the percentage of conversions for both of the two landing page variants, wherein completion is deemed to have occurred when the confidence intervals for the two landing page variants become non-overlapping.

* * * * *

UNITED STATES PATENT AND TRADEMARK OFFICE
CERTIFICATE OF CORRECTION

PATENT NO. : 8,682,712 B2  
APPLICATION NO. : 11/439501  
DATED : March 25, 2014  
INVENTOR(S) : Khopkar et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1017 days.

Signed and Sealed this  
Twenty-first Day of July, 2015

Michelle K. Lee  
*Director of the United States Patent and Trademark Office*